United States Patent
Kelman

[19]

[11] Patent Number: 6,127,021
[45] Date of Patent: Oct. 3, 2000

[54] MATERIAL SYSTEM FOR SOFT INTERIOR AUTOMOTIVE PARTS

[75] Inventor: Josh Kelman, Rochester, Mich.

[73] Assignee: Textron Automotive Company, Inc., Troy, Mich.

[21] Appl. No.: 09/108,352

[22] Filed: Jul. 1, 1998

[51] Int. Cl.[7] .................................. B32B 3/00; B60J 5/00; B27N 3/10

[52] U.S. Cl. ........................ 428/172; 428/178; 428/180; 296/146.7; 296/211; 264/257; 156/219

[58] Field of Search ...................................... 264/167, 175, 264/241, 257, 284; 428/172, 116, 180, 178, 542.2; 296/146.7, 211; 156/209, 219, 322; 181/288, 292, 293

[56] References Cited

U.S. PATENT DOCUMENTS

| | | |
|---|---|---|
| 4,211,590 | 7/1980 | Stweard et al. . |
| 4,824,714 | 4/1989 | Gest . |
| 4,840,832 | 6/1989 | Weinle et al. . |
| 5,082,716 | 1/1992 | Satterfield et al. . |
| 5,183,695 | 2/1993 | Masuhra et al. . |
| 5,225,130 | 7/1993 | Deiringer . |
| 5,275,865 | 1/1994 | Nicolay . |
| 5,509,247 | 4/1996 | Fortez et al. ............................. 428/180 |
| 5,660,908 | 8/1997 | Kelman et al. . |
| 5,679,296 | 10/1997 | Kelman et al. . |

*Primary Examiner*—Donald Loney
*Attorney, Agent, or Firm*—Reising, Ethington, Barnes, Kisselle, Learman & McCulloch, P.C.

[57] ABSTRACT

According to one aspect of the invention, a multi-layer automotive interior trim panel (10) comprises a decorative covering layer (12) and a supportive substrate layer (16). The substrate layer (16) is comprised of a rigid material formed into a predetermined shape for supporting the covering layer. The trim panel also includes an intermediate layer (18) disposed between the covering layer and the supportive substrate layer comprised of cushioning material. The intermediate layer includes a mat (20) of polymeric fibers, with the mat having a plurality of indentations (24) to provide a cushioning effect. A corresponding method for producing the interior trim panel having the three layers includes several steps. The first step is heating the cushion layer (18) to a predetermined temperature. The second step is melting a portion of the polymeric fibers in the cushion layer. The third step is stamping the cushion layer to form the plurality of indentations (24). The next step is adhering the cushion layer (18) to the covering layer (12) and the support layer (16) to form the trim panel (10).

17 Claims, 1 Drawing Sheet

MATERIAL SYSTEM FOR SOFT INTERIOR AUTOMOTIVE PARTS

TECHNICAL FIELD

The present invention relates to multi-layer automotive interior trim panels and the manufacturing process therefor.

BACKGROUND OF THE INVENTION

Automotive interior trim panels typically comprise a multi-layered construction. The layered construction may include an inner retainer or supportive substrate, an intermediate cushion layer, and an outer skin or covering. According to common practice, one injects a liquid precursor between the substrate and the skin, where it reacts to produce a foam that solidifies to comprise the cushion layer. This process generally takes place inside a mold, where an operator can place the skin layer and the substrate into an open mold in spaced apart fashion, then introduce the foam precursor between the skin and the substrate, and then close the mold as the precursor reacts to sandwich the three layers together. The operator must monitor the foam to ensure it cures evenly and completely. The operator must also ensure that the foam covers all of the area necessary to support the skin layer. Because of variabilities and uncertainties associated with the foam, manufacturers continue to either improve the foam aspect of the process, or seek alternative cushion layers.

SUMMARY OF THE INVENTION AND ADVANTAGES

According to one aspect of the invention, the multi-layer automotive interior trim panel comprises a decorative covering layer presenting a decorative surface and a supportive substrate layer attached to the covering layer. The substrate layer is comprised of a rigid material formed into a predetermined shape for supporting the covering layer. The trim panel also includes an intermediate layer disposed between the covering layer and the supportive substrate layer comprised of cushioning material. The intermediate layer includes a mat of polymeric fibers, with the mat having a plurality of indentations disposed across the mat to provide a cushioning effect.

A corresponding inventive method for producing the interior trim panel having the decorative covering layer, the rigid support layer and the intermediate cushion layer having a plurality of polymeric fibers includes several steps. The first step is heating the cushion layer to a predetermined temperature. The second step is melting a portion of the polymeric fibers in the cushion layer. The next step is stamping the cushion layer to form a plurality of indentations in the cushion layer. Then, the next step is adhering the cushion layer to the covering layer and the support layer to form a unitary, multi-layer trim panel.

By using such a cushion layer made from polymeric fibers, one avoids the variability and other problems associated with foam, making the process more repeatable, less expensive and more flexible. For example, the cushion layer need not be made at the time the panel is made; it can be fabricated at a place and time remote from the final assembly of the panel.

FIGURES IN THE DRAWINGS

Other advantages of the present invention will be readily appreciated as the same becomes better understood by reference to the following detailed description when considered in connection with the accompanying drawings wherein:

FIG. 1 is an exploded perspective view of the interior trim panel showing the several layers; and FIG. 2 is a sectional side view of the assembled trim panel of FIG. 1.

DESCRIPTION OF THE PREFERRED EMBODIMENT

Figure 1:
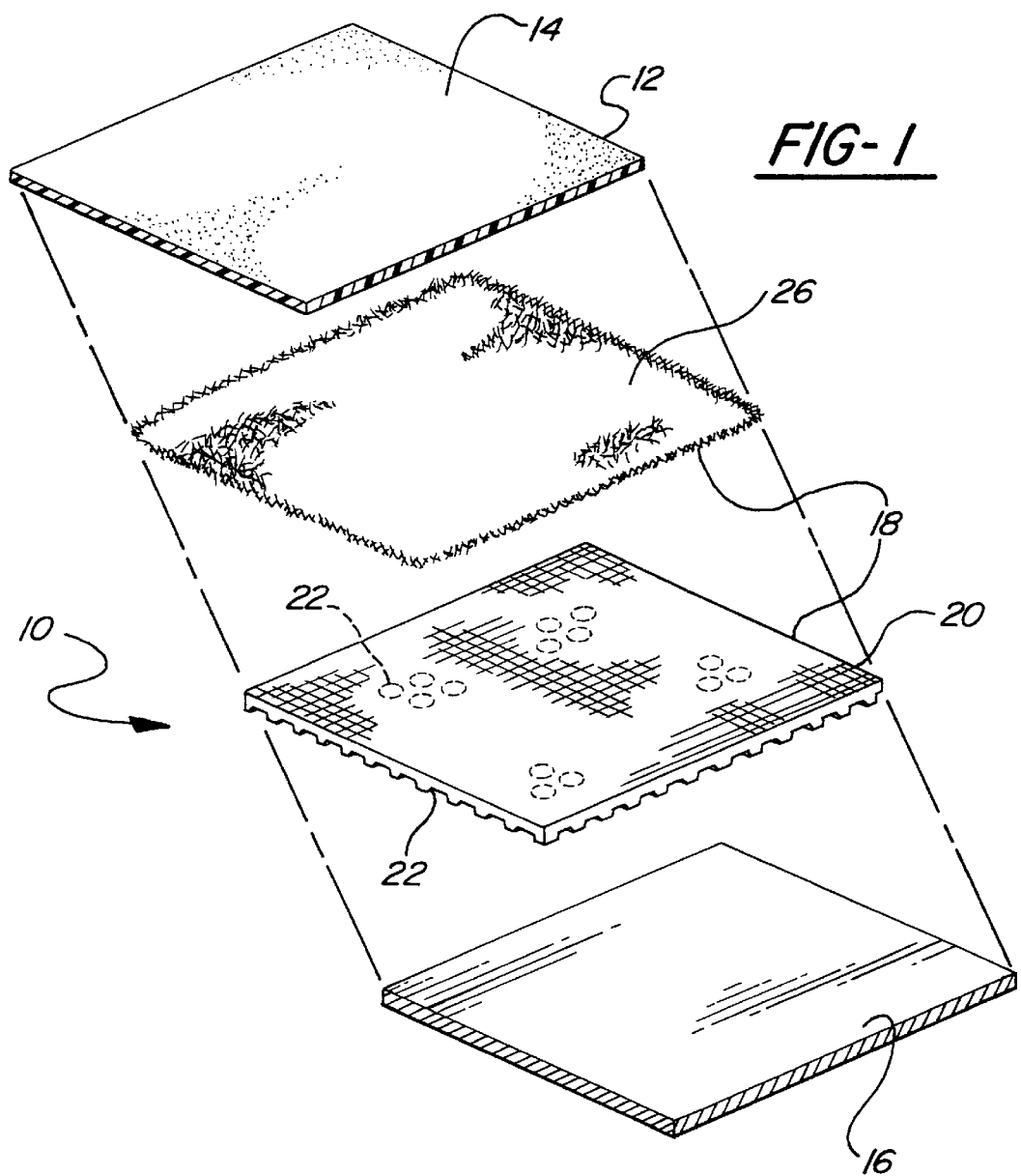
Figure 2:
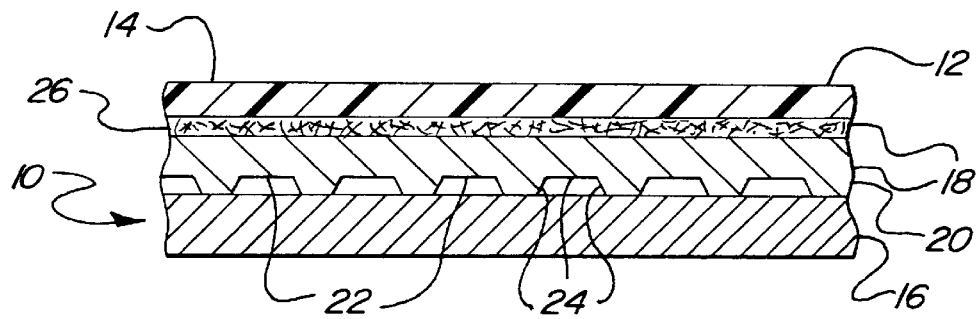

Referring to the Figures wherein like numerals indicate like or corresponding parts throughout the several views, a multi-layer automotive trim panel is generally shown at 10.

The multi-layer automotive interior trim panel 10 comprises a decorative covering layer 12 presenting a decorative surface 14, and a supportive substrate layer 16 attached to the covering layer. The substrate layer 16 is comprised of a rigid material formed into a predetermined shape for supporting the covering layer 12. The trim panel 10 also includes an intermediate layer 18 disposed between the covering layer and the supportive substrate layer comprised of cushioning material. The intermediate layer 18 includes a mat 20 of polymeric fibers, with the mat having a plurality of indentations 22 disposed across the mat to provide a cushioning effect.

A first portion of the polymeric fibers in the mat 20 has a predetermined first melting point, and a second portion of the fibers has a predetermined second melting point substantially higher than the first melting point. The general idea is to have two different melting points for the fibers comprising the mat 20 whereby a predetermined level of heat applied to the mat will melt the first portion of fibers without melting the second portion of fibers. In this way, the first portion of fibers can melt and re-solidify to hold the mat 20 in a new predetermined shape—e.g. a shape having indentations. This first portion of fibers—i.e. the low melt fibers—may also serve to adhere the mat 20 to the other layers of the trim panel 10. Meanwhile, the second portion of fibers will be unaffected by the application of heat, and these fibers will maintain their form and whatever inherent resiliency they possess.

It has been found beneficial to produce a mat 20 where the first portion of fibers comprises generally less than ten percent of the mat, with the second portion of fibers comprising the remainder of the mat. At least with the presently preferred material, this provides a good mix of high and low melt fibers to serve the aforesaid general objective. The presently preferred material for the fibers in the mat 20 is polyethylene teraphthalate (PET). This material comes in various forms, and with melting points at various levels.

The first and second portions of fibers (high melt and low melt) may be randomly distributed throughout the mat. However, for greater control over the shape of the mat, the low melt fibers may be disposed in the mat in predetermined locations. For example, low melt fiber placement can be oriented to enhance the formation of dimples 22. If there is a standard row and column pattern of dimples 22, one can knit or weave low melt fibers into the mat where needed to maintain the pattern. If the dimple 22 is a simple half moon or other similar cup shape, the low melt fibers should be placed in the walls 24 of the dimple 22. If there is a corrugation-type structure rather than a dimple structure, the low melt fibers can be concentrated in the walls of each corrugation indentation, with relatively fewer low melt fibers in the base of each corrugation indentation.

Given the preferred material for the mat 20 is PET material, the low melting point is generally in the range of 150–300 degrees Fahrenheit, and the high melting point is generally above 300 degrees Fahrenheit. However, the high melting point may be lower if the low melting point is in the low end of the range. The exact numbers for the high and low melting points will depend on the supplier of the material and the particular batch. Dupont is one company making PET fibers.

In the typical case, the low melt fibers in the mat 20 can be softened by heating them to the low melting point. Then the mat 20 can be stamped with the desired pattern. In one example, the pattern is a plurality of dimples 22 with a rough geometry of ¼ inch radius and ½ inch deep, 1 inch on center.

The mat 20 may acquire thickness by agglomerating or combining several sub-layers in conventional ways known to persons skilled in the art. For example, the mat 20 can be cross-lapped or woven with conventional knitting machines. The mat 20 may be made thick enough to be termed a bat.

The mat 20 achieves softness through the indentations 22 and through the inherent softness of the high melt fibers. To soften the cushioning layer 18 further, the trim panel 10 may further include an additional layer or sub-layer of polymeric fibers 26 disposed between the mat 20 and the covering layer 12. The additional layer of polymeric fibers 26 may include a first portion of fibers having the first (low) melting point and a second portion of fibers having the second (high) melting point. Conversely, the additional layer 26 may include no low melt fibers. This may be desirable if one relies on additional adhesives to bind the layers of the panel 10 together, and not on the low melt fibers. This may also be desirable if one does not expect to shape this additional layer 26 into any particular form or geometry other than as a mat or bat In one example of this additional layer 26, one may dispose a plurality of tufted polymeric fibers over the mat. These fibers are available in the form of tufts or bundles or clusters of fibers made from polyethylene teraphthalate (PET). DuPont, for example, makes such a product under the commercial designation Dacron Polyester Fiber. These fibers are typically kinked and provide a soft, resilient feel. In the typical case, the clusters include 20–30 fibers and are about one inch in diameter. In another example, the additional fiber layer may be in the form of a mat or bat—and not in the form of tufts.

Generally, less than ten percent of the fibers have a relatively low melting point—in the range of 150–300 degrees Fahrenheit—and the remaining fibers have a relatively high melting point—generally (but not necessarily) over 300 degrees Fahrenheit. The composition of low melt/ high melt fibers is beneficial because some of the fibers will melt at the lower temperature to help adhere the clusters to the mat and even to the cover layer of the trim panel. The remaining fibers will retain their structure to provide a soft, resilient feel to the cushion layer 18. The exact ratio of high melt fibers to low melt fibers is not critical; nor is the exact melting point of the respective types of fibers.

The fiber tufts in the additional layer 26 can be applied by blowing the fibers onto the mat 20 while the mat is on a conveyer or other work surface. The mat 20 and fibers may then be run through an oven or a heat stamping process, or they may be subject to jets of hot air. These processes will soften the low melt fibers in the mat 20 and in the tufts to effect a bond between the mat and the fiber tufts. Other processes for applying and adhering the fiber tufts to the mat 20 will occur to persons of skill in the art.

The invention does not depend on particular choices for the covering layer 12 and the supportive substrate layer 16. The covering layer 12 is basically a decorative layer of material having at least one decorative surface 14 suitable for use in a vehicle interior. This layer 12 is generally flexible or even limp, requiring some sort of rigid substrate or support structure to maintain the desired shape. The substrate layer 16 serves this purpose. The covering layer 12 may be attached directly to the substrate 16—or indirectly by attaching to the cushion layer 18 which in turn attaches to the substrate. Within the parameters of the teachings herein, several appropriate materials will present themselves to persons of skill in the interior trim art. However, in view of the teachings of U.S. Pat. Nos. 5,660,908 and 5,679,296 it may be advantageous to use the same basic material for all of the layers—including the covering layer 12, cushion layer 18 and substrate layer 16. For example, the covering layer 12, the intermediate layer 18 and the substrate layer 16 may be made from PET material. This enhances the economies of recycling the trim panel 10.

The trim panel 10 may include a layer of adhesive (not shown) disposed between the intermediate cushion layer 18 and the cover layer 12, and between the cushion layer 18 and the supportive substrate layer 16. Suitable adhesives are generally known to persons of skill in the art. In some cases it may be necessary to use such adhesive, but not if the low-melt PET material in the mat 20 and in the additional layer 26 provide enough binding or adhesive force to adhere all of the layers of the trim panel 10 together.

A corresponding method for producing the interior trim panel 10 having a decorative covering layer 12, a rigid support layer 16 and an intermediate cushion layer 18 having a plurality of polymeric fibers includes several steps. The first step is heating the cushion layer 18 to a predetermined temperature. This step can be performed with jets of hot air or by running the layer 18 or even the entire panel 10 through an oven. Likewise, the operation can be performed in a heated mold.

The second step is melting a portion of the polymeric fibers in the cushion layer 18. This step follows from the first step when the heat is applied at or above the melting point of a portion of the fibers in the mat 20. According to the teachings herein, one should use a cushion layer 18 having some low melt fibers and some high melt fibers.

The next step is stamping the cushion layer 18 to form a plurality of indentations 24 in the cushion layer 18. When the low melt fibers are soft or melted from the application of heat, then stamping the cushion layer will help create a pattern in the layer. The stamping follows known techniques. For example, one might stamp the material in a press using cold platens as taught in U.S. Pat. No 5,660,908.

Then, the next step is adhering the cushion layer 18 to the covering layer 12 and the support layer 16 to form a unitary, multi-layer trim panel 10. The step of adhering the cushion layer 18 to the covering layer 12 and the support layer 16 may include heating the cushion layer 18 to a predetermined temperature to render at least a portion of the cushion layer adhesive. For example, if the cushion layer 18 includes low melt PET fibers, these fibers are adhesive when heated to their melting point. These low melt fibers alone may provide the necessary adhesive force to bond the layers together. However, it has been said that one might also choose a suitable adhesive to adhere the two layers. In this latter case, the cushion layer 18 may be allowed to cool and re-solidify before adhesives are used to adhere this layer to the other layers.

The method may include the step of disposing the fibers having a relatively low melting point among fibers having the relatively high melting point at predetermined locations in the cushion layer 18 prior to the step of melting the portion of polymeric fibers. As stated above, this allows greater control over placement of the fibers to ensure the cushion layer 18 will retain its shape. The low melt fibers can be woven into the mat 20 or bat at predetermined locations 24, or otherwise inserted.

Additional steps may be added relating to the application of the fiber clusters. Suggestions for these steps are set forth above.

The cushion layer 18 including the mat 20, possibly together with the additional layer 26, can be prefabricated prior to the time when the cushion layer is assembled into the trim panel 10 with the other two layers 12, 16. For example, the mat 20 can be stamped or otherwise formed into a desired shape, as discussed above. Further, the additional layer 26 can be applied to the mat for various reasons—perhaps to soften the feel of the mat.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A multi-layer automotive interior trim panel comprising:
   a decorative covering layer presenting a decorative surface;
   a supportive substrate layer attached to said covering layer, said substrate layer being comprised of a rigid material formed into a predetermined shape for supporting said covering layer;
   an intermediate layer disposed between said covering layer and said supportive substrate layer comprised of cushioning material;
   said intermediate layer including a mat comprised of polymeric fibers, said mat including a plurality of indentations disposed across said mat to provide a cushioning effect.

2. The trim panel of claim 1 wherein said mat includes a first portion of said polymeric fibers having a predetermined first melting point, and a second portion of said fibers having a predetermined second melting point substantially higher than said first melting point whereby a predetermined level of heat applied to said mat will melt said first portion of fibers without melting said second portion of fibers.

3. The trim panel of claim 2 wherein said first portion of fibers comprises less than ten percent of said mat, with said second portion of fibers comprising the remainder of said mat.

4. The trim panel of claim 1 further including an additional layer of polymeric fibers disposed between said mat and said covering layer.

5. The trim panel of claim 4 wherein said additional layer of polymeric fibers includes a first portion of fibers having said first melting point and a second portion of fibers having said second melting point.

6. The trim panel of claim 4 wherein said additional layer of fibers includes tufts of fibers.

7. The trim panel of claim 4 wherein said additional layer of fibers is made from polyethylene teraphthalate.

8. The trim panel of claim 1 wherein said indentations have a dimple shape.

9. The trim panel of claim 1 wherein said indentations are formed in said mat by stamping.

10. The trim panel of claim 2 wherein said first and second portions of fibers are randomly distributed throughout said mat.

11. The trim panel of claim 2 wherein said first portion of fibers are disposed in said mat in predetermined locations.

12. The trim panel of claim 1 wherein said polymeric fibers in said mat are polyethylene teraphthalate.

13. The trim panel of claim 1 wherein said covering layer, said intermediate layer and said substrate layer are made from the same polymeric material.

14. The trim panel of claim 1 further including a layer of adhesive disposed between said intermediate layer and said cover layer, and between said intermediate layer and said supportive substrate layer.

15. A method for producing an interior trim panel having a decorative covering layer, a rigid support layer and an intermediate cushion layer having a plurality of polymeric fibers including the steps of:
    heating the cushion layer to a predetermined temperature;
    melting a portion of the polymeric fibers in the cushion layer;
    stamping the cushion layer to form a plurality of indentations in the cushion layer;
    adhering the cushion layer to the covering layer and the support layer to form a unitary, multi-layer trim panel.

16. The method of claim 15 wherein the step of adhering the cushion layer to the covering layer and the support layer includes heating the cushion layer to a predetermined temperature to render at least a portion of the cushion layer adhesive.

17. The method of claim 15 further including the step of disposing fibers having a relatively low melting point among fibers having a relatively high melting point at predetermined locations in the cushion layer prior to the step of melting the portion of polymeric fibers.

* * * * *